United States Patent
Mainguet et al.

(10) Patent No.: US 10,909,345 B2
(45) Date of Patent: Feb. 2, 2021

(54) METHOD FOR CAPTURING A HEAT PATTERN

(71) Applicants: Commissariat à l'énergie atomique et aux énergies alternatives, Paris (FR); Idemia Identity & Security France, Issy-les-Moulineaux (FR)

(72) Inventors: Jean-François Mainguet, Grenoble (FR); Joël Yann Fourre, Marly le Roi (FR)

(73) Assignees: COMMISSARIAT À L'ÉNERGIE ATOMIQUE ET AUX ÉNERGIES ALTERNATIVES, Paris (FR); IDEMIA IDENTITY & SECURITY FRANCE, Issy-les-Moulineaux (FR)

( * ) Notice: Subject to any disclaimer, the term of this patent is extended or adjusted under 35 U.S.C. 154(b) by 303 days.

(21) Appl. No.: 15/779,738

(22) PCT Filed: Nov. 28, 2016

(86) PCT No.: PCT/EP2016/078985
§ 371 (c)(1),
(2) Date: May 29, 2018

(87) PCT Pub. No.: WO2017/093176
PCT Pub. Date: Jun. 8, 2017

(65) Prior Publication Data
US 2020/0311366 A1  Oct. 1, 2020

(30) Foreign Application Priority Data
Nov. 30, 2015 (FR) ..................... 15 61577

(51) Int. Cl.
*G06K 9/00* (2006.01)
*G01J 5/04* (2006.01)
(Continued)

(52) U.S. Cl.
CPC ............ *G06K 9/0002* (2013.01); *G01J 5/046* (2013.01); *G01J 5/34* (2013.01); *G01K 7/003* (2013.01)

(58) Field of Classification Search
CPC .......... G06K 9/0002; G06K 9/00–0012; G01J 5/046; G01J 5/34; G01J 5/10; G01K 7/003
See application file for complete search history.

(56) References Cited

U.S. PATENT DOCUMENTS 4,394,773 A  7/1983 Ruell
4,429,413 A  1/1984 Edwards
(Continued)

FOREIGN PATENT DOCUMENTS

CN  1098054 C  1/2003
EP  2385486 A1  11/2011

OTHER PUBLICATIONS

International Search Report for International Application No. PCT/EP2016/078985 dated Mar. 15, 2017.
(Continued)

*Primary Examiner* — Roberto W Flores
(74) *Attorney, Agent, or Firm* — Pearne & Gordon LLP (57) ABSTRACT

Method for capturing a heat pattern with a sensor including a plurality of pixels each comprising a heat-sensitive measuring element, the sensor comprising an element for heating the measuring element, the method including carrying out the following steps for each pixel: a first heating step in which a first amount of heating power is dissipated in the measuring element; a first step of measuring the heat pattern, comprising a first read-out of the heat-sensitive measuring element, after a first delay time; a second heating step in which a second amount of heating power is dissipated in the measuring element; a second step of measuring the heat pattern, comprising a second read-out after a second delay
(Continued)

time; and wherein the first amount of power is different from the second amount of power and/or the length of the first delay time is different from that of the second delay time.

14 Claims, 4 Drawing Sheets

(51) Int. Cl.
 *G01J 5/34* (2006.01)
 *G01K 7/00* (2006.01)

(56) References Cited

U.S. PATENT DOCUMENTS

| | | | | |
|---|---|---|---|---|
| 6,061,464 | A * | 5/2000 | Leger | G06K 9/0002 |
| | | | | 382/124 |
| 6,091,837 | A | 7/2000 | Dinh | |
| 6,241,288 | B1 * | 6/2001 | Bergenek | G07C 9/37 |
| | | | | 283/67 |
| 6,289,114 | B1 | 9/2001 | Mainguet | |
| 8,801,274 | B2 | 8/2014 | Maiguet et al. | |
| 2009/0067684 | A1 * | 3/2009 | Mainguet | G06K 9/0002 |
| | | | | 382/124 |
| 2009/0206851 | A1 | 8/2009 | Chuang et al. | |
| 2011/0280276 | A1 * | 11/2011 | Mainguet | G01K 7/003 |
| | | | | 374/102 |
| 2013/0277558 | A1 * | 10/2013 | Yamamura | G01J 5/22 |
| | | | | 250/338.3 |
| 2015/0191309 | A1 | 7/2015 | Mainguet et al. | |
| 2016/0148034 | A1 * | 5/2016 | Kremin | G06F 3/044 |
| | | | | 382/124 |
| 2018/0032781 | A1 | 2/2018 | Mainguet et al. | |
| 2018/0032782 | A1 | 2/2018 | Mainguet et al. | |

OTHER PUBLICATIONS

Written Opinion for International Application No. PCT/EP2016/078985 dated Mar. 15, 2017.
Preliminary French Search Report issued in Patent Application No. FR 15 61577 dated Sep. 16, 2016.
U.S. Appl. No. 15/900,505; entitled "Print Sensor with Gallium Nitride LED", filed Feb. 20, 2018.
U.S. Appl. No. 15/922,204; entitled "Optical Imaging Device", filed Mar. 15, 2018.
Office action dated Nov. 4, 2019 for CN 1098054C and translation thereof.

* cited by examiner

METHOD FOR CAPTURING A HEAT PATTERN

This is a National Stage application of PCT international application PCT/EP2016/078985, filed on Nov. 28, 2016, which claims the priority of French Patent Application No. 15 61577, filed Nov. 30, 2015, both of which are incorporated herein by reference in their entirety.

TECHNICAL FIELD AND PRIOR ART

The invention relates to a method for capturing a heat pattern during which several measurements of the heat pattern are carried out at each pixel of the sensor with which the method is implemented. This method is advantageously implemented to carry out fingerprint capture by thermal detection.

It is known to produce a fingerprint sensor comprising thermal detection means. These thermal detection means may correspond to pyroelectric elements, diodes, thermistors or any other heat-sensitive element enabling the conversion of a variation in temperature into a variation of another parameter of the sensitive element such as an electrical potential at the terminals of the heat-sensitive element, an electric current generated by the heat-sensitive element or instead a variation in the electrical resistance of the heat-sensitive element.

Fingerprint detection may be carried out by so-called "passive" sensors exploiting a difference in temperature between the finger and the sensor, as described in the documents U.S. Pat. Nos. 4,394,773, 4,429,413 and 6,289,114. These sensors have however the drawback of carrying out a measurement that depends uniquely on the difference in temperature between the finger and the sensor. It may thus happen that the level of the signal obtained is zero when the finger and the sensor are at the same temperature, or that the contrast of the captured images varies, which then poses problems during later processing of the captured images.

In order to eliminate these problems posed by passive thermal sensors, and also to be able to carry out a static acquisition where the finger does not move, so-called "active" sensors have been proposed, such as for example that described in the documents U.S. Pat. No. 6,091,837 and EP 2 385 486 A1. In such an active sensor, each pixel comprises a pyroelectric capacitance formed of two conductive electrodes between which a portion of pyroelectric material is arranged, and a heating element.

This heating element dissipates a certain amount of heat in the pixel (notably in the portion of pyroelectric material), and the heating of the pixel is measured at the end of a certain acquisition time in the presence of the finger on the sensor.

This makes it possible to distinguish, at each pixel, the presence of a ridge or a valley of the measured fingerprint depending on whether the heat is absorbed by the skin (pixel in the presence of a ridge of the fingerprint) or conserved in the pixel (pixel in the presence of a valley of the fingerprint). This leads to a lower final temperature in the case of a pixel in the presence of a ridge, where the heat is absorbed by the skin, unlike a pixel in the presence of a valley where the heat is not absorbed by the skin and remains at the level the pixel.

To the first order, such a sensor makes it possible to measure the heat capacity, also called specific heat or specific heat capacity, of an element (the finger during a fingerprint capture) in contact with the sensor. The measurements obtained also depend on the thermal conductivity between the sensor and the part of the element (ridge or valley in the case of a fingerprint) that is present.

The heating elements generally use the Joule effect by dissipating heat from a resistive element which is fed by a current. One of the levels of the technological stack forming the pixels is advantageously used to form these heating elements. For example, it is possible to use one of the conductive levels serving to form the transistors and the interconnections of the sensor if one of said levels comprises a conductive material having a suitable resistivity and to which it suffices to apply one of the voltages already available in the sensor, for example the supply voltage of the sensor, to generate heating by Joule effect. This is notably used when the sensor comprises transistors of TFT (Thin-Film Transistor) type formed on a glass substrate.

The pixels of such a sensor are arranged by forming a matrix of several lines and several columns. The reading of the pixels is generally carried out line by line. The heating elements may then also be controlled line by line by means of a transistor at the head of each line, which makes it possible not to have to add control transistors in the pixels serving uniquely to control the heating of the pixels. Each line of heating elements is for example connected, on one side of the matrix of pixels, to ground, and on the other side to a control transistor connected to a suitable power supply in such a way as to control the current flow through the heating elements and thus the thermal power injected by Joule effect into the pixels by said heating elements.

During a conventional reading of a heat pattern with a sensor with active thermal detection, all the pixels of the sensor are read in the same way and in a regular manner at the same rhythm, that is to say with a fixed delay time which is identical for all the pixels. This delay time, which corresponds to a duration during which a pixel carries out the measurement of the heat pattern, is generally adjusted in such a way as to obtain a maximum contrast between the ridges and the hollows of the fingerprint, that is to say sufficiently long to obtain a high signal to noise level. This delay time must not however be too long so that the duration of the measurement remains acceptable by the user and so that measurement is not perturbed by possible movements of the finger on the surface of the sensor.

A compromise has to be found because a long delay time has the advantage of increasing the contrast of the image obtained, but implies on the other hand a greater diathermy, that is to say a greater dispersion of heat between neighbouring pixels, leading to a certain fuzziness in the image obtained. A shorter delay time makes it possible to reduce this diathermy, but with in return a lower contrast in the image obtained and certain parasitic elements, such as residues or droplets of water or grease, assimilated with parts of the element of which the heat pattern is captured, for example assimilated with ridges of a fingerprint.

It has been observed that the thermal characteristics of skin vary depending on its hydration level. For example, the ratio between the thermal conductivity (in W/m/K) of skin having a hydration level equal to around 100% and that of skin having a hydration level equal to around 0% is equal to around 10. The drier the skin, the less it conducts heat. However, dry skin conducts heat much better than air. In addition, by considering the thermal effusivity (which corresponds to the thermal conductivity multiplied by the volumetric heat, and which characterises the capacity to exchange thermal energy) and the thermal diffusivity (which corresponds to the thermal conductivity divided by the volumetric heat, and which characterises the rate at which an element diffuses heat within it) of air, water, as well as skin with different hydration levels, several observations may be made:

- air diffuses rapidly the heat within it, but communicates it very poorly to another element in contact with the air;
- water diffuses heat 100 times less rapidly than the air within it, but on the other hand exchanges 300 times faster than air the heat with another element in contact with the water;
- a totally dehydrated skin diffuses 5 times less well the heat within it than water or 100% hydrated skin, and also exchanges 5 times less well the heat with another element in contact with it than water or 100% hydrated skin.

The variations in the level of humidity of the element of which the heat pattern is measured, for example the level of hydration of the skin of which the fingerprint is captured, thus have an influence on the image of the captured heat pattern.

In addition, none of the sensors of the prior art exploits this additional information linked to the hydration level of the skin present on the sensor during fingerprint capture, or more generally the information linked to the level of humidity of the element(s) present on the sensor during a measurement of the heat pattern of this or these element(s), in order to improve the quality of the capture of the heat pattern.

DESCRIPTION OF THE INVENTION

An aim of the present invention is to propose a method for capturing a heat pattern making it possible to improve the quality of the capture of the heat pattern and/or to exploit the information linked to the level of humidity of an element of which the heat pattern is measured, for example information linked to the hydration level of the skin during a fingerprint capture.

To do so, the invention proposes a method for capturing a heat pattern by a sensor comprising several pixels each including at least one heat-sensitive measuring element, the sensor further including at least one heating element capable of heating the heat-sensitive measuring element of each of said pixels during a measurement of the heat pattern by the heat-sensitive measuring element of said pixel, the method comprising at least carrying out the following steps for each of said pixels:

- a first step of heating the heat-sensitive measuring element of the pixel, in which a first heating power is dissipated in the heat-sensitive measuring element of the pixel;
- a first step of measuring the heat pattern present on the pixel, including a first read-out of at least one temperature variable parameter of the heat-sensitive measuring element of the pixel after a first delay time;
- a second step of heating the heat-sensitive measuring element of the pixel, in which a second amount of heating power is dissipated in the heat-sensitive measuring element of the pixel;
- a second step of measuring the heat pattern present on the pixel, including a second read-out of the temperature variable parameter of the heat-sensitive measuring element of the pixel after a second delay time;

and in which the value of the first power is different from that of the second power and/or the value of the first delay time is different from that of the second delay time.

The method according to the invention proposes reading, at each of the pixels, a heat pattern, for example that of a fingerprint, with different delay times and/or different heating powers, in order to obtain different types of thermal information which may be seen as thermal measurements carried out at different depths in the element(s) present on the sensor on account of the propagation of heat which differs according to the value of the delay time and/or the value of the dissipated power.

By carrying out for example a first heating such that it dissipates a low first heating power and/or a first measurement of the heat pattern with a first short delay time, a first image formed of so-called "surface" information is obtained, that is to say which correspond to the measurement of the heat pattern at a small depth of the element(s). This comes from the fact that by carrying out a heating dissipating a low power and/or by carrying out a measurement of the heat pattern with a short delay time, the heat caused by the heating does not have the time to propagate to considerable depth of the element(s) of which the heat pattern is measured. The second image produced with a second heating dissipating a greater power and/or with a second measurement of the heat pattern with a longer delay time comprises on the other hand information which concerns a part at greater depth of the element(s) present on the sensor. This second measurement makes it possible for example to read the heat pattern of the element(s) present behind residues found on the sensor. On the other hand, this second measurement reveals in this case, for a given depth, fewer details on the elements present on the sensor due to the fact that the diathermy during this second measurement is greater than that occurring during the first measurement on account of the greater dissipated power and/or the longer delay time.

From these two images, it is thus possible to improve the quality of the capture made due to the fact that the information contained in these images may be combined to only conserve relevant information of each of the images. This method is particularly advantageous when it is implemented with a thermal fingerprint sensor in order to capture both the fine details of the fingers (obtained using a short delay time and/or a low dissipated power) and the other characteristics of the fingerprint in greater depth (obtained using a long delay time and/or a high dissipated power), while eliminating from the final image potential traces of residues present on the sensor.

Moreover, by monitoring the evolution of the temperature from one image to the next, it is possible to deduce therefrom information relative to the level of humidity of the element(s) present on the sensor and of which the heat pattern is measured, for example the level of hydration of the skin of which the fingerprint is captured.

The delay time is defined as being the duration between the instant at which the measurement by a pixel is initiated, for example the instant at which a pixel begins to accumulate charges generated by the measurement, and the instant of reading this pixel, for example the instant at which the charges accumulated in the pixel during the delay time are sent into a reading circuit.

The expression "capable of heating the heat-sensitive measuring element of said pixel during a measurement of the heat pattern by the heat-sensitive measuring element of said pixel" signifies that the heating obtained is sufficiently important so that at the end of a certain measurement time (the delay time), the measurement obtained, that is to say the variation in the temperature variable parameter of the heat-sensitive measuring element, corresponding to the measured difference in temperatures, is significant for detecting the heat pattern. The heating obtained may be such that a variation in temperatures of at least 0.5 K, for example around 1 K, of the heat-sensitive measuring element between a pixel in contact with skin and a pixel which is not in contact with skin may be obtained when the measured heat pattern corresponds to a fingerprint. The choice of the value of this variation in temperature depends notably on the sensitivity of the heat-sensitive measuring element, the size of the pixel and the noise of the reading circuit of the sensor.

The expression "heat pattern" designates a spatial distribution of the thermal characteristics of an object which is detectable by the sensor, for example the pattern of a fingerprint.

The value of the first delay time may be less than that of the second delay time, and/or the value of the first power may be less than that of the second power.

A ratio between the first and second delay times may be comprised between around 2 and 10 (with for example a first delay time equal to around 100 μs and a second delay time equal to around 1 ms), and/or a ratio between the first and second heating powers may be greater than or equal to 10 (with for example a first heating power equal to around 1 mW and a second heating power equal to around 10 mW).

The first and second steps of heating the heat-sensitive measuring element of the pixel may be implemented in the form of a continuous heating phase at constant power.

The method may further comprise, after the second measurement of the heat pattern present on each of the pixels, a step of digital processing of the first and second images of the heat pattern, corresponding respectively to all of the first measurements of the heat pattern and to all of the second measurements of the heat pattern, including at least one comparison and/or at least one linear combination of the first and second images. Thus, it is possible to determine the evolution of the temperature at each of the pixels between the first and second measurements of the heat pattern, which notably makes it possible to identify the presence of residues and/or droplets of water or grease on certain pixels, different humidity or hydration levels of the element present on the sensor and, in the case of a capture of a fingerprint, the presence of air or skin on each pixel, that is to say the presence of a ridge or a valley of the fingerprint on each pixel.

This step of processing may form a new image from the first and second images of the heat pattern, this new image which can be representative of the comparison and/or of the linear combination of the first and second images.

In this case, the method may further comprise, between the second measurement of the heat pattern present on each of the pixels and the step of digital processing of the first and second images of the heat pattern, a step of deconvolution of the second image. Such a deconvolution, performed by digital processing, makes it possible to correct the effects of diathermy present in the second image in order to make it similar to the first image in terms of precision of the details of the captured heat pattern.

The method may further comprise, after the step of digital processing of the first and second images of the heat pattern, a step of identification of ridges and valleys of a fingerprint from the data coming from the step of digital processing of the first and second images of the heat pattern.

The method may further comprise, after the step of identification of the ridges and valleys of the fingerprint:

a step of calculation of a hydration level of the skin of which the heat pattern has been measured, from an abacus or a function expressing the level of hydration as a function of the result obtained during a measurement of the heat pattern for a pixel on which a ridge has been identified, or a step of calculation of a difference in measurements between that obtained during the second measurement of the heat pattern for a first pixel on which a ridge has been identified and that obtained during the second measurement of the heat pattern for a second pixel on which a valley has been identified, then a step of calculation of a hydration level of the skin of which the heat pattern has been measured, from an abacus or a function expressing the level of hydration as a function of the difference in measurements between a ridge and a valley of a fingerprint.

The level of hydration obtained may serve to distinguish certain types of false fingers, for example made of silicone or gelatine, of which the thermal characteristics are sufficiently remote from those of a real finger.

The method may be such that:
each heat-sensitive measuring element comprises at least one pyroelectric capacitance formed by at least one portion of pyroelectric material arranged between the first and second electrodes;
the heating element is capable of emitting radiation that heats by Joule effect the portion of pyroelectric material of the pyroelectric capacitance of said pixel;
the first heating of the heat-sensitive measuring element of a pixel includes an application of a first heating voltage to the terminals of the heating element, dissipating the first heating power by Joule effect in the portion of pyroelectric material of the pyroelectric capacitance of the pixel;
the first measurement of the heat pattern present on a pixel includes a read-out of the charges generated by the pixel during the first delay time;
the second heating of the heat-sensitive measuring element of a pixel includes an application of a second heating voltage to the terminals of the heating element, dissipating the second heating power by Joule effect in the portion of pyroelectric material of the pyroelectric capacitance of the pixel;
the second measurement of the heat pattern present on the pixel includes a read-out of the charges generated by the pixel during the second delay time.

In an alternative, the method may be such that:
each heat-sensitive measuring element comprises at least one pyroelectric capacitance formed by at least one portion of pyroelectric material arranged between the first and second electrodes, and
the heating element is capable of emitting a light radiation intended to heat the portions of pyroelectric material of the pyroelectric capacitances of the pixels.

The light radiation emitted by the heating element may be oriented on a protective layer of the pixels and/or one of the first and second electrodes of the pixels.

This heating by light radiation of portions of pyroelectric material may take place directly by illuminating the portions of pyroelectric material, or indirectly by heating other elements than the portions of pyroelectric material, for example the electrodes of the pyroelectric capacitance or a surface protective layer of these pyroelectric capacitances or instead a specific layer dedicated to this heating by light radiation, said other elements transmitting heat by conduction to the portions of pyroelectric material.

Generally speaking, other types of sensor and/or other types of heating means than those described previously may be used for the implementation of the method of the invention. For example, the heat-sensitive measuring elements of the sensor may be thermistors.

The two steps of heating the heat-sensitive measuring elements of the pixels of the sensor may be implemented in a manner spaced apart from each other, with a delay time between the two heating steps. In an alternative, it is possible that the two heating steps are implemented in the form of a continuous phase of heating the pixels, with in this case a second delay time greater than the first delay time, said two delay times starting at the same moment.

In the embodiments described previously, only two heating steps and two delay times are described. Generally speaking, the method may comprise n heating steps implemented with n heating powers, and n measurements of the heat pattern carried out with n delay times, n being an integer greater than or equal to 2. By making it possible to choose the number of measurements of the heat pattern carried out at different depths, it is possible to characterise the fine structure of each layer of material placed on the sensor.

The sensor may further comprise optical or capacitive detection elements interlaced with the pixels including the heat-sensitive measuring elements.

A non-zero delay may separate the start of the first heating and the start of the first delay time, and the method may further comprise the implementation of a preliminary measurement of the heat pattern present on the pixels via a reading of the temperature variable parameter of the heat-sensitive measuring elements of the pixels at the end of said delay, then an estimation of the disparities between the pixels of the sensor from the preliminary measurement of the heat pattern.

BRIEF DESCRIPTION OF THE DRAWINGS

The present invention will be better understood on reading the description of exemplary embodiments given for purely indicative purposes and in no way limiting and by referring to the appended drawings in which.

Identical, similar or equivalent parts of the different figures described hereafter bear the same numerical references in order to make it easier to go from one figure to the next.

The different parts shown in the figures are not necessarily according to a uniform scale, in order to make the figures more legible.

The different possibilities (alternatives and embodiments) should be understood as not being mutually exclusive and may be combined together.

DETAILED DESCRIPTION OF PARTICULAR EMBODIMENTS

Figure 1:
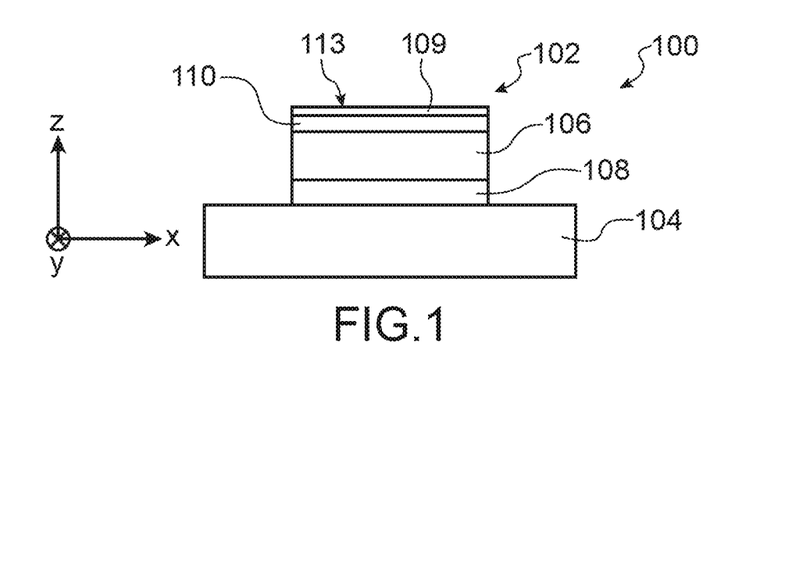
FIG. 1 shows a sectional view of a pyroelectric capacitance of a pixel of a sensor which can be used for the implementation of a method for capturing a heat pattern, the subject matter of the present invention.

Reference is firstly made to FIG. 1 which shows a sectional view of a pyroelectric capacitance of a pixel 102, which forms the thermal detection element, or the heat-sensitive measuring element, of the pixel 102 of a heat pattern sensor 100. This sensor 100 corresponds to an example of sensor that can be used for the implementation of a method for capturing a heat pattern with several measurements for each pixel of the sensor as described hereafter.

The sensor 100 comprises a substrate 104 corresponding for example to a glass substrate or a semiconductor substrate (for example silicon). A substrate 104 made of glass may be used when the sensor 100 is produced with TFT transistors, whereas a substrate 104 made of semiconductor, for example silicon, may be used when the sensor 100 comprises transistors produced using MOS technology. The substrate 104 may also be a flexible substrate, for example comprising polyimide or PEN (polyethylene naphthalate) or PET (polyethylene terephthalate), on which the electronic elements of the sensor 100 are produced by printed electronic technology (for examples via a production with ink jet type print heads) or by lithography.

The pixels 102 of the sensor 100 are arranged by forming a matrix of several lines and several columns of pixels 102. The pitch of the pixels 102, in the plane (X,Y) (that is to say the plane of the substrate 104), is for example comprised between around 25 µm and 100 µm. In the case of a standard sensor 100 of resolution equal to 500 dpi (dots per inch), the pitch of the pixels 102 is equal to 50.8 µm.

Each of the pixels 102 of the sensor 100 comprises heat-sensitive measurement, or thermal detection, means here formed by a pyroelectric capacitance. Each pyroelectric capacitance comprises a portion 106 of pyroelectric material arranged between a lower electrode 108 and an upper electrode 110. The pyroelectric material of the portion 106 is advantageously polyvinylidene fluoride or PVDF, or poly(vinylidene fluoride-trifluoroethylene) or P(VDF-TrFE). In an alternative, the pyroelectric material of the portion 106 may be AlN or PZT, or any other pyroelectric material suited to form a pyroelectric capacitance. The thickness of the portion 106 is for example comprised between around 500 nm and 10 µm.

The electrodes 108, 110 each comprise at least one electrically conductive material, for example a metal material such as titanium of thickness equal to around 0.2 µm, and/or molybdenum and/or aluminium and/or a conductive oxide such as ITO (indium tin oxide) and/or a conductive polymer. One of the electrodes 108, 110, advantageously the upper electrode 110, or each of the two electrodes 108, 110, may be formed by a stack of several electrically conductive materials, for example a Ti/TiN/AlCu stack. The thickness of each of the electrodes 108, 110 is for example comprised between around 0.1 µm and 1 µm.

A protective layer 109, corresponding for example to a layer of AlN or any other material suited to the production of this layer, covers the upper electrode 110. The thickness of the protective layer 109 may be comprised between several microns and around 100 μm. An upper face 113 of the protective layer 109 corresponds to the surface above which is located the heat pattern intended to be detected, for example a finger of which the fingerprint is intended to be detected.

In order that the PVDF of the portion 106 acquires it pyroelectric (and also piezoelectric) properties, this material is subjected, once in the lifetime of the pyroelectric capacitance, to an electric field of around 100 volts per micron of thickness of PVDF. The molecules inside the PVDF become oriented, and thus remain oriented, even when the PVDF is no longer subjected to this electric field. The PVDF may thereby be biased by applying an initial biasing voltage to the terminals of the electrodes 108, 110.

After this initial biasing, when the portion 106 is subjected to a variation in temperature ΔT, this variation in temperature ΔT causes the appearance of an additional electric field generating charges ΔQ between the electrodes 108, 110 such that:

$$\Delta Q = S \cdot \gamma \cdot \Delta T.$$

The parameter S corresponds to the surface of the portion 106 facing each of the electrodes 108, 110. The parameter γ corresponds to the pyroelectric coefficient of the pyroelectric material of the portion 106. For example, the pyroelectric coefficient γ of PVFD is equal to around 29 μC/m²/K.

The portion 106 and the electrodes 108, 110 forming a capacitance of value C to which are added parasitic capacitances Cp, and the charges ΔQ generated in this capacitance induce a difference in electrical potentials ΔV between the electrodes 108, 110 such that:

$$(C + C_p) \Delta V = \Delta Q = S \cdot \gamma \cdot \Delta T.$$

However, in addition to the charges generated by the capacitance of value C, other charges are also generated via the parasitic capacitances Cp present, for example those connected to the gate of the reading transistor in the case of a voltage reading circuit.

When the potential on the reading electrode (formed by one of the electrodes 108, 110) is fixed (so-called "current" reading), the charges generated flow to the reading circuit by forming an integrated current at the output, with in this case:

$$\frac{\Delta Q}{\zeta} = \frac{S \cdot \gamma \cdot \Delta T}{\zeta}.$$

with ζ corresponding to the delay time during which the measurement is carried out by the pixel. Such a current reading has the advantage of being insensitive, to the first order, to the value of the capacitances, in particular the parasitic capacitances.

The sign of the electric voltage ΔV obtained between the electrodes 108, 110, or the direction of the current in the case of a current reading, depends on the direction of the electric field with which the PVDF of the portion 106 has been initially biased. In the case of certain other pyroelectric materials such as aluminium nitride, this direction of initial biasing depends on the manner in which the pyroelectric material has been deposited, its order and its crystallographic orientation. Moreover, the electric voltage ΔV obtained, or the direction of the current, may be positive or negative depending on whether the variation in temperature undergone by the pyroelectric capacitance is positive or negative.

Figure 2:
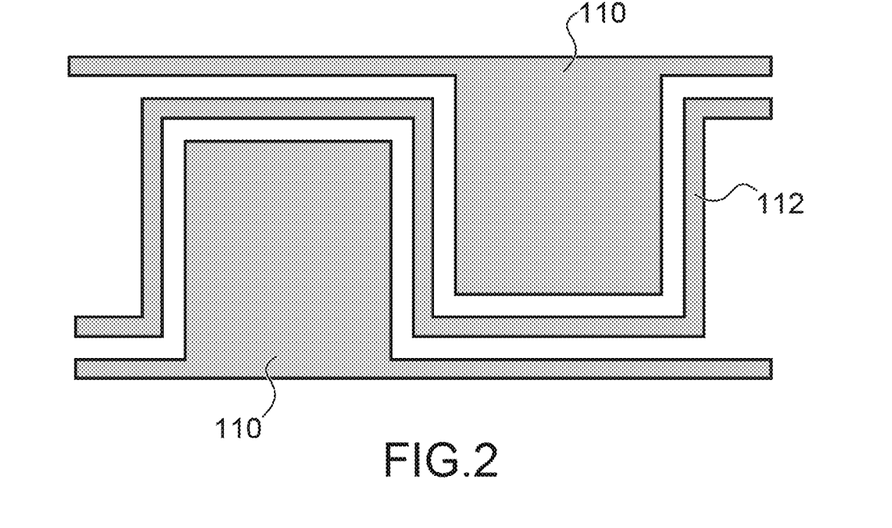
FIG. 2 shows a top view of a part of a sensor which can be used for the implementation of a method for capturing a heat pattern, the subject matter of the present invention.

The sensor 100 also comprises heating elements dissipating a certain amount of heat in the pixels 102, and notably in the portion 106 of pyroelectric material. In the sensor 100 described here, these heating elements are conductive elements transferred beside the pyroelectric capacitances, formed advantageously from one of the conductive layers serving for the formation of one of the electrodes 108, 110 of the pyroelectric capacitances. FIG. 2 schematically shows such a configuration, in which a same metal layer, here the upper metal layer, serves for the formation of the upper electrodes 110 and a conductive element 112 produced in the form of a coil partially surrounding the upper electrodes 110 and making it possible to heat laterally the pyroelectric capacitances formed between the upper electrodes 110 and the lower electrodes 108.

The heating of the portion 106 of pyroelectric material is obtained by making a current flow in the conductive element 112 forming the heating element. The intensity of the heating obtained notably depends on the intensity of the current flowing through the conductive element 112.

The value of the heating voltage applied to the conductive element 112, and thus the value of the current circulating in the conductive element 112, is adjusted compared to the resistivity of the conductive material used in order to produce the desired thermal energy in the pixels 102. The dissipated power per pixel 102 may advantageously be comprised between around 0.1 mW and 1 mW.

Different alternative embodiments of the sensor 100 may be envisaged. Thus, the geometry of the conductive element 112 may be different from that described previously in relation with FIG. 2. It is possible that the heating elements of the pixels are formed by one or several distinct conductive portions which can be located at the same level or not as one of the electrodes.

In addition, heating elements other than resistive elements may be used, such as for example optical heating elements. For example, one or several LEDs, laser diodes, may emit a radiation which is transmitted by the substrate 104 and absorbed by the pyroelectric material of the portions 106 of the pixels 102, and/or by one of the electrodes 108, 110 of the pixels 102, and/or by a specific absorption layer, for example composed of partially oxidised ITO, carbon, oxidised chromium, or instead a polymer filled with coloured pigment, added near to one of the electrodes or directly on one of the electrodes. For example, in the case of heating by infrared radiation, electrodes made of titanium and/or ITO may advantageously be used to absorb said radiation. Advantageously, the radiation may be absorbed by the protective layer 109. For example, the wavelength of the optical radiation could be comprised between around 450 nm and 1000 nm and the protective layer 109 may comprise DLC (Diamond-Like Carbon), a pigment filled resin or any other material enabling an important absorption of the optical radiation used. Such an optical heating carry out in this case the heating of a region of the sensor 100 or of the whole of the sensor 100. Such a heating by optical radiation is advantageously implemented in the case of sensors of small dimensions, in particular scanning sensors.

The use of optical heating makes it possible to avoid electronic perturbations of the heating (and thus to be able to modulate it during the delay time) and/or to have access to heating steps in "flash" mode, that is to say heating by radiation of very short duration.

Finally, it is also possible that the heat-sensitive measuring elements of the sensor do not correspond to pyroelectric capacitances, but correspond for example to thermistors, diodes, or any other suitable heat-sensitive element.

Apart from the pyroelectric capacitances of the pixels 102, the sensor 100 also comprises electronic elements making it possible to read the electrical charges generated by the pyroelectric capacitances and thus to read the heat pattern detected by the sensor 100.

Figure 3:
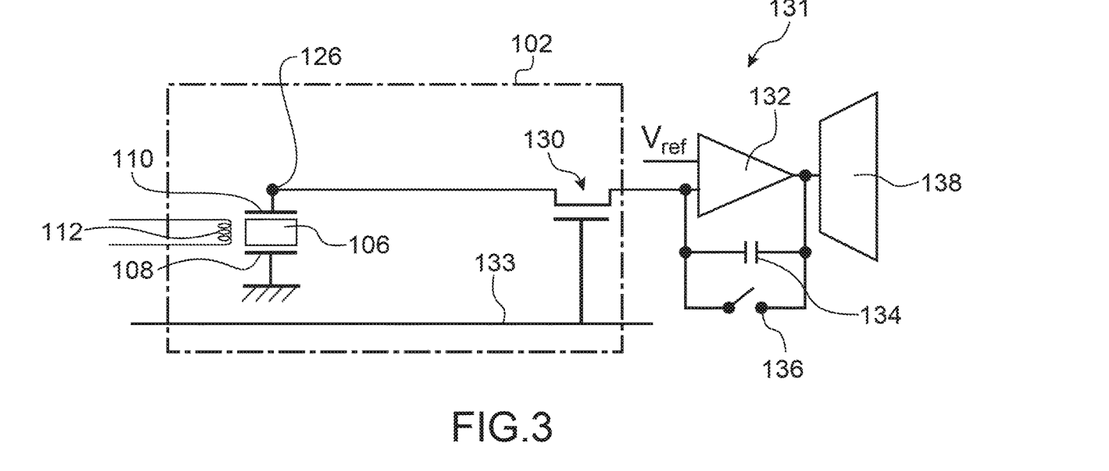
FIG. 3 shows a first exemplary embodiment of a circuit for reading a pixel of a sensor used for the implementation of a method for capturing a heat pattern, the subject matter of the present invention.

FIG. 3 shows a first exemplary embodiment of these electronic elements making it possible to read the variation in electrical charges appearing in the pyroelectric capacitance of one of the pixels 102 of the sensor 100.

The pixel 102 shown in FIG. 3 comprises a pyroelectric capacitance formed by the portion 106 of pyroelectric material arranged between the two electrodes 108, 110. The lower electrode 108 is connected to ground and the upper electrode 110 forms an electrode for the pixel 102 and is connected to an active node 126 of the pixel 102.

Each pixel 102 comprises a line selection transistor 130. The gate of the transistor 130 is connected to an electrical connection 133 common to all the transistors 130 of a same line and on which a selection signal is intended to be applied. A first of the source and drain electrodes of the transistor 130 is connected to the active node 126 and a second of the source and drain electrodes of the transistor 130 is connected to an input of a reading circuit 131 located at the foot of the column. This input of the reading circuit 131 corresponds to the inverting input of a reading amplifier 132 corresponding for example to an operational amplifier. An electrical biasing potential $V_{ref}$ is applied to the non-inverting input of the amplifier 132. The output of the amplifier 132 is looped back on its inverting input through a capacitance 134. A switch, or commutator, 136 is connected in parallel to the capacitance 134 and makes it possible to short circuit the capacitance 134. The output of the reading amplifier 132 is also connected to the input of an analogue/digital converter 138. The reading amplifier 132, the capacitance 134 and the switch 136 and the analogue/digital converter 138 are common to all the pixels 102 of a same column. The analogue/digital converter 138 may be common to all the pixels 102 of the sensor 100, with the addition of electronic multiplexing elements between the outputs of the reading amplifiers 132 and the analogue/digital converter 138.

During a measurement of the heat pattern present on the pixel 102 of FIG. 3, the pixel 102 is firstly reset by closing the switch 136 (if this was previously in open position) and by turning on the transistor 130. The potential $V_{ref}$ is then applied to the node 126. The heating of the pyroelectric material of the portion 106 starts by making a current flow in the conductive element 112. The pyroelectric capacitance is at this moment at a temperature $T_0$.

The switch 136 is next opened. The integration then starts at the pyroelectric capacitance of the pixel 102, during a delay time $\zeta$. Electrical charges are generated by the pyroelectric capacitance of the pixel 102 during this delay time $\zeta$. Due to the fact that the switch 136 is opened and that the transistor 130 is on, the electrical charges generated by the pyroelectric capacitance of the pixel 102 flow to the capacitance 134 associated with the pixel 102. At the end of this delay time $\zeta$, the pyroelectric capacitance is at the temperature $T_1$ and has thus been subjected to a variation in temperature $\Delta T = T_1 - T_0$, the electrical charges generated by the pyroelectric capacitance and stored in the capacitance 134 being the consequence of this variation in temperature.

The electrical potential at the output of the amplifier 132 is thus $V_{out} = Q \cdot C_{ref} + V_{ref}$, with Q corresponding to the electrical charges generated and $C_{ref}$ the value of the capacitance 134. This potential is then read and sampled by the analogue/digital converter 138. When the operation of reading and sampling the result is finished, the switch 136 is switched to the closed position in order to discharge the capacitance 134 and the transistor 130 is turned off to isolate the pixel 106 and to enable the reading of another pixel of the column. This reading operation is implemented simultaneously for all the pixels 102 of a same line.

Figure 4:
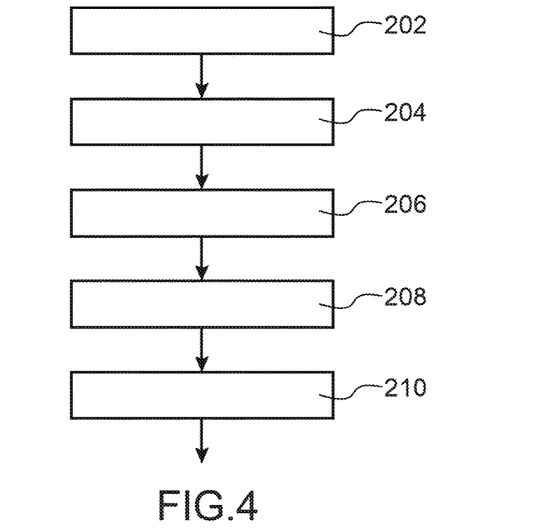
FIG. 4 shows the steps of a method for capturing a heat pattern, the subject matter of the present invention, according to a particular embodiment.

A method for capturing a heat pattern will now be described, in relation with FIG. 4, corresponding here to that of a fingerprint, in which two, or more than two, consecutive measurements of the heat pattern are implemented for each pixel 102 of the sensor 100, according to a first embodiment.

In this first embodiment, two different delay times are used to carry out two measurements of the heat pattern for each pixel 102. The same reading system, for example that described previously in relation with FIG. 3, is used to carry out these measurements for each pixel 102.

At the step 202, a first heating of the heat-sensitive measuring element of the pixel 102, that is to say of the pyroelectric capacitance of the pixel 102, is carried out by making a first current flow in the conductive element 112. This first heating makes it possible to dissipate a first heating power $P_1$ in the pixel 102, here equal to around 1 mW.

A first measurement of the heat pattern of the element present on the pixel 102 is next carried out after a first delay time $\zeta_1$ here equal to around 50 µs (step 204). This first delay time $\zeta_1$ corresponds to the duration during which the charges are created in the pixel 102, here between the instant at which the first heating is started and the instant at which the first reading is carried out. For the reading system described previously in relation with FIG. 3, the instant at which the first reading is carried out corresponds to the instant at which the output potential of the amplifier 132 is read.

The information obtained by this first measurement at each of the pixels 102 may be qualified as "surface" information. Indeed, with this first short delay time $\zeta_1$, the information obtained makes it possible to identify, at the pixel 102, if air is present or if material (skin or residue) is in contact with the pixel 102.

The first image obtained from the first measurements implemented for all the pixels 102 of the sensor 100 makes it possible to reproduce finely the details of the heat pattern of the finger and the residues present on the sensor 100 because by using a first short delay time, the diathermy between the pixels 102, that is to say the exchange of heat between neighbouring pixels, is minimal due to the fact that the heat does not have the time, or has little time, to propagate on the sides of the pixels 102.

The information obtained by this first measurement of the heat pattern of each pixel 102 is next completed by a second reading of the pixels carried out with a longer delay time. Indeed, given the short delay time $\zeta_1$ used for the first measurement of the heat pattern, the first image obtained has several defects:

the droplets of water and/or grease left for example after placing a damp finger on the sensor or due to condensation around a damp finger may be merged with skin in contact with pixels;

the driest parts of the finger may produce a signal which can be merged with residues present on the surface of the sensor 100.

To carry out this second reading, a second heating of each of the pixels 102 is carried out by making a second current flow in the conductive element 112 (step 206). In this first embodiment, the value of this second current is substantially equal to that of the first current, thereby dissipating in the pixel 102 a second heating power $P_2$ substantially similar to $P_1$, for example equal to around 1 mW.

A second measurement of the heat pattern of the element present on the pixel 102 is next carried out after a second delay time $\zeta_2$ different from the first delay time $\zeta_1$, here such that $\zeta_2 > \zeta_1$, and for example equal to around 500 µs (step 208).

The two heating steps are here implemented in a consecutive manner, without interruption between them. Thus, by considering an instant $T_0=0$ µs at which the heating is started, the first reading is then carried out at an instant $T_1=50$ µs. The heating is next continued without interruption then the second reading is carried out at an instant $T_2=500$ µs. The consecutive implementation of the different heating phases makes it possible to benefit from, for the second heating phase, the duration corresponding to the first delay time $\zeta_1$. In the above example, the instants $T_1$ and $T_2$ are thus spaced apart from each other by a duration of 450 µs.

The characteristics of this second image are different from those of the first image obtained previously. Indeed, by using a longer delay time, heat has the time to propagate in greater depth in the material present on the pixels. Thus:
  the droplets of water and/or grease potentially present on the sensor have the time to absorb heat and are thus no longer merged with the skin in contact with the sensor, their heat capacity being lower than that of skin;
  since skin is thicker than the residues potentially present on the sensor, it may be distinguished from these residues.

On the other hand, the diathermy is greater during this second reading than during the first reading, which gives less good fineness of details than in the first image.

In an alternative, the different heating steps implemented for a pixel may be carried out in a non-consecutive manner, with a phase of interruption between two heating steps during which no current flows in the conductive element 112 (or by stopping the lighting of the pixels 102 in the case of heating by optical radiation).

In this case, the delay times of the different measurements are de-correlated from the order in which they intervene. For example, returning to the example described previously, it could be possible to have in this case $\zeta_2 < \zeta_1$, which signifies that the first image would correspond to a capture of the heat pattern in greater depth than the second image. The implementation of two heating steps in a non-consecutive manner may be carried out notably when the powers $P_1$ and $P_2$ of these two heating steps are different from each other in order to avoid that the noise generated during the change of power falsifies the second measurement.

According to another alternative, it is possible to consider, instead of the second image, the difference between the second image and the first image. This difference between the two images has substantially the same characteristics (a little more accentuated) than that of the second image. This is particularly advantageous when the reading circuit carries out a reading in charges, as is the case in the example of FIG. 3, where it is this difference in image which is acquired when the two heating steps are implemented consecutively, without interruption between them, due to the fact that the reading of the first image by the reading circuit 131 may bring about a destruction of the charges generated during the first heating.

The two images obtained are advantageously comparable in terms of dynamic or histogram. If this is not the case, it is possible to modify one of the two images in order to make them comparable, either in a static manner for example via a calibration of the sensor or more generally by modifying a parameter of the acquisition chain used to obtain this image, or by maximising the similarity between the two images or between the histograms of the images for example via image processing software. Potential defects of the sensor (FPN or "Fixed Pattern Noise", PNRU or "Pixel Response Non Uniformity", etc.) may be corrected upstream of the combination of the two images or after this because these defects are identical and present in the two images.

The two images obtained make it possible to obtain more information than during a conventional capture carried out with a single image of the heat pattern. In the case of a capture of the heat pattern of a fingerprint, the following information may be obtained:
  the so-called "cold" pixels of the first image, that is to say those of which the measured temperature corresponds to the lowest temperatures among all those obtained during the first measurement, and of which the temperature has not much changed in the second image are considered as pixels in contact with skin, that is to say pixels on which a ridge of the fingerprint is present;
  the so-called "lukewarm" pixels of the first image, that is to say those of which the measured temperature corresponds to average temperatures among all those obtained during the first measurement, and of which the temperature has increased significantly in the second image are considered as pixels in contact with residues or droplets of water and/or grease, but not pixels in contact with skin;
  the so-called "hot" pixels of the first image, that is to say those of which the measured temperature corresponds to the highest temperatures among all those obtained during the first measurement, and of which the temperature remains high in the second image are considered as pixels in contact with air, that is to say pixels on which a valley of the fingerprint is present;
  the so-called "lukewarm" pixels of the first image and of which the temperature has decreased in the second image are considered as pixels in contact with dry skin.

The extraction of this additional information may be done by carrying out beforehand a digital processing of the images obtained (step 210). This digital processing includes at least one comparison and/or one combination of the first and second images. By designating the first image $I_1$ and the second image $I_2$, this digital processing may consist in carrying out the following operation: $\alpha \cdot I_1 + (1-\alpha) \cdot (I_1 - I_2)$, with $\alpha \in ]0; 1[$. A linear combination of the two images is thereby carried out. Other linear combinations may be envisaged. Identical points in the two images are not modified, and those that differ are attributed an intermediate value.

Such a linear combination of the two images may be done by simple electronic elements located at the foot of columns of the matrix of pixels. For example, the signal of the first image may be sampled in a first sampler, and the signal of the second image may be sampled in a second sampler. An adder applying the desired weightings between the two images may next combine these two signals before input into the analogue/digital converter.

This linear combination may also be carried out by a programmable logic component, for example of CPLD or FPGA type, having a memory of which the capacity may be limited to the memorisation of data coming from a single line of pixels. This makes it possible to preserve an interface at the output of this component which is comparable to simple sensors and to integrate it in a system without modification of architecture or software.

In an alternative, this digital processing may consist in calculating a new image corresponding to the operation: $\max((I_1+I_2)/2, I_2)$, that is to say the selection, for each pixel, of the maximum among $(I_1+I_2)/2$ and $I_2$. This non-linear operation makes it possible to choose, for each pixel, the clearest information of each image. This comes down to inserting in an image the pixels appearing darker in the other image. In other words, returning to the example described previously, this comes down to taking the first image corresponding to a surface image of the captured fingerprint and adding thereto the dry zones of the fingerprint which appear darker in the second image.

Advantageously, it is possible to classify regions (that is to say groups of pixels) of the measured heat pattern depending on their content: dry finger, trace or residue, damp finger, empty, then to apply a second digital processing appropriate for each region. This second digital processing, different for each type of region, may serve for the synthesis, or the creation, of a new image. This can be done by classifying the pixels individually then by filtering the result obtained (elimination of isolated points, etc.), and the processing in each region may comprise a linear combination with suitable weightings between the images and/or a comparison of these images. The following rules may for example be applied:

In a "damp finger" zone, the two images provide comparable information. However, the second is more blurred, or noisier, if it has been processed by a deconvolution algorithm. For such a zone, it is thus preferable to use the information coming from the first image or a linear combination of the two images in which the weighting of the first image is greater than that of the second image in order to preserve as best as possible the details provided by the first image and to limit noise.

In a "dry finger" zone, the first image only contains part of the information, and this information is better reproduced by the second image. For such a zone, it is thus preferable to use the second image or a linear combination of the two images in which the weighting of the second image is greater than that of the first image.

In a "trace" or "residue" zone, the information of this trace or of this residue is more important in the first image than in the second image. It is thus preferable to use the second image or a linear combination of the two images in which the weight of the second image is greater than that of the first image.

In an "empty" zone, none of the images contains information, this emptiness being deduced from the "hot" pixels in the two images. The average of the two images may for example be used to limit the random noise relative to this zone.

Optionally, smoothed transitions between the regions can make it possible to avoid artefacts. Indeed, near to the frontiers between the different regions, it is interesting to use averages between the two images in order to limit visible artefacts during a sudden passage from one image to the next. Thus, in the presence of a frontier with on the one side weightings attributed to the two images respectively of 1 and 0 and on the other side weightings respectively of 0 and 1, it is judicious to make these weightings vary in a progressive manner near to the frontier, over a strip of several pixels (for example 10 pixels). To do so, it is possible to use a linear function, or a cubic function for example of type $(3x-x^3)/2$ or instead a spline. It is also possible to calculate weighting maps of the two images and to apply a smoothing to these maps.

In another configuration, the second image may be used to define the zones where the finger is in contact with the sensor and rejects the zones where there are only traces. The first image may then be conserved in the zones where there is a finger in contact, with if need be an increase in contrast by software for the driest parts of the finger. The second image serves in this case to carry out this classification and the information is only extracted from the first image. Thus, it is not necessary that the second image reproduces the fine details and may be perturbed by important diathermy (and thus blurring) without impact on the final image. It is for example possible to filter the first image, for example by a Gaussian or median filter, then to implement a step of non-linear processing performing for example a thresholding of extreme values, or any other transformation eliminating the lowest and highest values, and stretching out the value lying between the two. For example, in the case of an image in which the value x of each pixel is encoded on 8 bits (between 0 and 255): if x<50, then x=0 (elimination of the lowest values); if x>150, then x=255 (elimination of the highest values); if 50≤x≤150, then x=2.55*(x−50) (spreading of the values of the pixels initially comprised between 50 and 150 over the range of values 0-255. It is also possible that the first image is corrected from the second image for example by multiplying one with the other. For example, by designating i1 the pixels of the first image and i2 the pixels of the second image, a function of the type (i1, i2)→a+b·i1+c·i1·i2 may be applied. Another possible correction is to carry out in the first image a filter (median or Gaussian) of which the size of support varies as a function of the second image. Thus, visible artefacts in the first image and not in the second images are eliminated or attenuated.

Generally speaking, the step of digital processing may serve to create, or synthesise, a new image from the first and second images of the heat pattern.

The greater diathermy in the second image can be corrected by a deconvolution implemented on the second image, prior to the digital processing described above. To do so, it is possible to use a Wiener filter with a priori knowledge of the PSF (Point Spread Function), or iterative algorithms, including algorithms without a priori the PSF since the objective is to have the same PSF in the two images. Having the same PSF in the two images has the advantage of eliminating differences at the level of the contrasted contours of the image. Deconvolution makes it possible to obtain a similar PSF between the two images to make them comparable.

Finally, other digital processing steps from the fingerprint acquisition field may be applied to the merged image, that is to say the result of the digital processing carried out from the two images, in order to improve its visual aspect, such as for example:

a normalisation of the dynamic (local equalisation of histogram), a reduction in noise, an accentuation of the contours (or a deconvolution), a segmentation of the fingerprint and an elimination of the background.

In this first embodiment, the powers $P_1$ and $P_2$ dissipated during two heating phases are identical, and for example equal to around 1 mW. In addition, the first delay time $\zeta_1$ is for example equal to around 50 μs and is less than the second delay time $\zeta_2$ which is for example equal to around 500 μs. The ratio between the two delay times $\zeta_1$ and $\zeta_2$ may be comprised between around 2 and 10.

In a second embodiment, the two measurements of the heat pattern by the sensor 100 may be carried out with substantially identical delay times $\zeta_1$ and $\zeta_2$, and the two heating phases may be carried out with injected powers $P_1$ and $P_2$ of different value, for example such that $P_1<P_2$. This difference in power is obtained by changing the value of the current injected into the heating resistance of the pixels during the second heating phase compared to the first heating phase, and thus by using a heating potential $V_{heating2}$ greater than $V_{heating1}$.

The ratio between the two powers $P_1$ and $P_2$ is advantageously greater than or equal to 10. For example, to limit the instantaneous power (due to the fact that a whole line of pixels is heated in a sensor such as that described previously in relation with FIG. 2), the power $P_1$ may be equal to around 0.1 mW per pixel, and the power $P_2$ may be equal to around 1 mW per pixel. A selector of the level of current sent into the heating elements of the sensor 100 can make it possible to carry out these two measurements at different powers.

The two embodiments described previously may be combined in order that the different measurements of the heat pattern are carried out with different delay times and different injected powers.

Moreover, whatever the embodiment, more than two steps of heating and measuring the heat pattern may be carried out successively for a same pixel.

For example, by using a greater number of steps of heating and measurements for each pixel, this method can perform a "layer by layer" capture of the heat pattern captured by the sensor.

This method may be implemented to detect that the element present on the sensor 100 during the capture of the heat pattern is a real finger, and not a reproduction of a fingerprint for example made of silicone. To do so, it is possible to verify that the more one moves away from the surface of the sensor 100 (the distancing of the sensor corresponds to a measurement carried out with a longer delay time and/or with a higher dissipated power), the more the skin is hydrated and thus the more the heat capacity of the element present on the sensor increases. This verification may consist in checking that at least one part of the pixels have their temperature which no longer corresponds to a certain predetermined temperature range. If this condition is not fulfilled, it is possible to deduce therefrom that the element present on the sensor 100 is a false finger.

In the first exemplary embodiment described previously in relation with FIG. 3, the electrical charges generated in each pixel 102 are read directly by the amplifier 132. Due to the fact that the electronic reading elements in each pixel 102 only correspond to a single transistor 130, this first exemplary embodiment is well suited for a production of the transistor 130 using TFT technology, the production cost of which is low. In addition, in this first exemplary embodiment, the reading time by the amplifier 132 is short, for example comprised between around 1 and 10 µs, or even zero if the pixel 102 is connected to the amplifier 132 during the integration as is the case in the example described previously. Finally, in TFT technology, the circuit comprising the pixels 102 is distinct from that comprising the elements 132, 134, 136 and 138, said circuits being assembled next by transfer of one on the other or by other solutions (Chip on Flex, wires, etc.).

Figure 5:
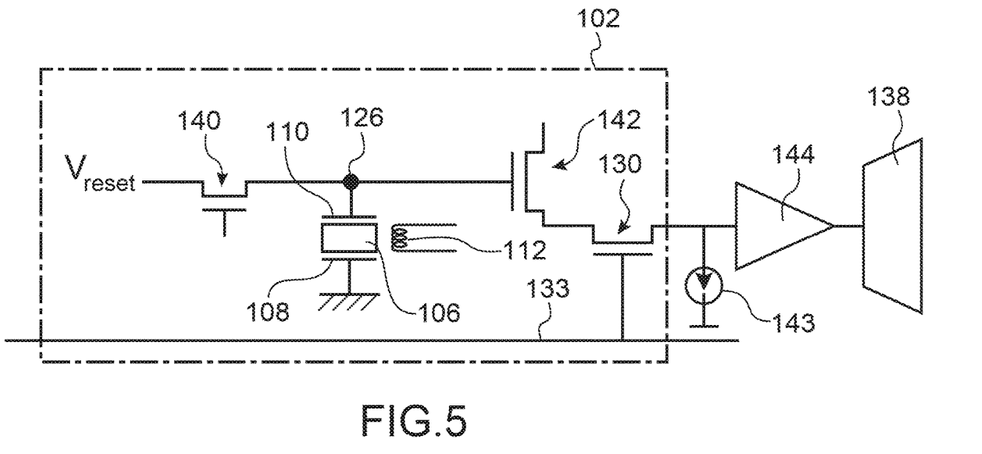
FIG. 5 shows a second exemplary embodiment of a circuit for reading a pixel of a sensor used for the implementation of a method for capturing a heat pattern, the subject matter of the present invention.

FIG. 5 shows a second exemplary embodiment of the electronic elements making it possible to read in voltage the measurements of the pixels 102 of the sensor 100.

As in the first exemplary embodiment, each pixel 102 comprises the pyroelectric capacitance connected to the active node 126. Each pixel 102 is also provided with a reset transistor 140 of which one of the source and drain electrodes is connected to the node 126 and of which the other of the source and drain electrodes is subjected to the application of a reset voltage $V_{reset}$. A control signal for resetting the pixel 102 is applied to the gate of the reset transistor 140. This resetting makes it possible to place the electrical potential of the node 126 at a known value (here $V_{reset}$) at the start of the integration, as well as to empty the charges from the pyroelectric capacitance once the reading has finished. As for the control of the pixel line selector transistor 130, the control of the reset transistor 140 may be common to an entire line of pixels 102.

Unlike the first exemplary embodiment in which the node 126 is directly connected to a first of the source and drain electrodes of the transistor 130, the node 126 is here connected to a gate of another transistor 142 forming a voltage follower and producing an amplification of the read signal, that is to say of the potential of the electrode 110, changing with the electrical charges generated by the pyroelectric capacitance of the pixel 102. An electrical supply potential is applied to a first of the source and drain electrodes of the transistor 142 and a second of the source and drain electrodes of the transistor 142 is connected to the first of the source and drain electrodes of the transistor 130. A second of the source and drain electrodes of the transistor 130 is connected to the input of the reading circuit 131 formed of an amplifier 144, inverter or not, of gain G. The output of the amplifier 144 is connected to the input of the analogue/digital converter 138. A current source 143 is also coupled to the input of the amplifier 144 in order to fast bias the transistor 142 in an operating zone where it behaves as voltage follower.

In this second exemplary embodiment, the reading of a pixel 102 is carried out through three transistors, for example of MOS type. The reading takes place in voltage and benefits from the local amplification produced by the follower transistor 142 which blocks the flow of charges on the active node 126. In TFT technology, the transistors may for example be made from polysilicon or IGZO.

This second exemplary embodiment carries out a non-destructive reading of the charges generated by the pyroelectric capacitances. Indeed, as long as the active node 126 has not undergone resetting, the electrical charges generated are kept.

In the case of the second exemplary embodiment shown in FIG. 5, the resulting reading voltage obtained at the output of the amplifier 144 depends on the value of the pyroelectric capacitance in addition to the parasitic capacitances present on the active node 132, and is equal to $G(V_{reset} \pm \Delta Q/C_{pyro})$.

When the electronic reading elements correspond to the second exemplary embodiment shown in FIG. 5, the reading of one of the pixels 102 of the device 100 may be carried out by implementing the following steps:

resetting the pyroelectric capacitance via the turning on of the reset transistor 140;

turning off the pixel line selection transistor 130;

turning on the heating to the power $P_1$;

turning off the reset transistor 140;

start of integration of the pixel 102 which is then at the temperature $T_0$;

waiting for the first delay time $\zeta_1$, for example equal to around 30 µs;

reading the pixel 102 which is then at the temperature $T_1$, corresponding to the turning on of the transistor 130 which makes it possible to recopy the voltage received on the gate of the follower transistor 142 to the amplifier 144 and to sample the value obtained after this conversion;

resetting the pixel by switching on the reset transistor 140, the potential $V_{reset}$ being applied to the node 126;

modifying the heating power to $P_2$; the line selection transistor 130 is still on, the voltage of the pyroelectric capacitance remains at $V_{reset}$ and the potential charges induced by the change in temperature are eliminated;

turning off the selection transistor line 130, that which isolates the pyroelectric capacitance vis-à-vis the reading circuit;

turning off the reset transistor 140;

waiting for the second delay time $\zeta_2$, for example equal to around 300 μs;

reading the charges accumulated in the pyroelectric capacitance which is at the temperature $T_2$, via the turning on of the transistor 130, which makes it possible to obtain the variation in temperatures $\Delta T_2 = T_2 - T_1$;

stopping the heating.

It is possible to carry out more than two measurements at different delay times and/or powers to increase the number of images of the heat pattern at different depths.

Whatever the embodiment of the electronic reading elements of the sensor 100, the pixels 102 are advantageously read line by line.

Although not shown, the sensor 100 comprises a control circuit making it possible to apply the control signals described above for driving the reading of the pixels 102.

Although not shown, the sensor 100 may further comprise an electronic processing circuit capable of constructing an overall image of the heat pattern from the measurements made at each of the pixels 102. This electronic processing circuit may also be capable of comparing this image with several images stored in a database in order to identify if the heat pattern detected corresponds to one of those stored in the database. The electronic processing circuit may also be capable of displaying an image of the heat pattern detected.

Moreover, the sensor 100 advantageously comprises, in addition to the thermal detection elements described previously, optical or capacitive detection elements making it possible to detect an image of the element of which the heat pattern is also detected. Thus, the sensor 100 may comprise a matrix of optical or capacitive detection pixels interlaced with the thermal detection pixels of which the heating and the reading are driven as described previously.

Figure 6:
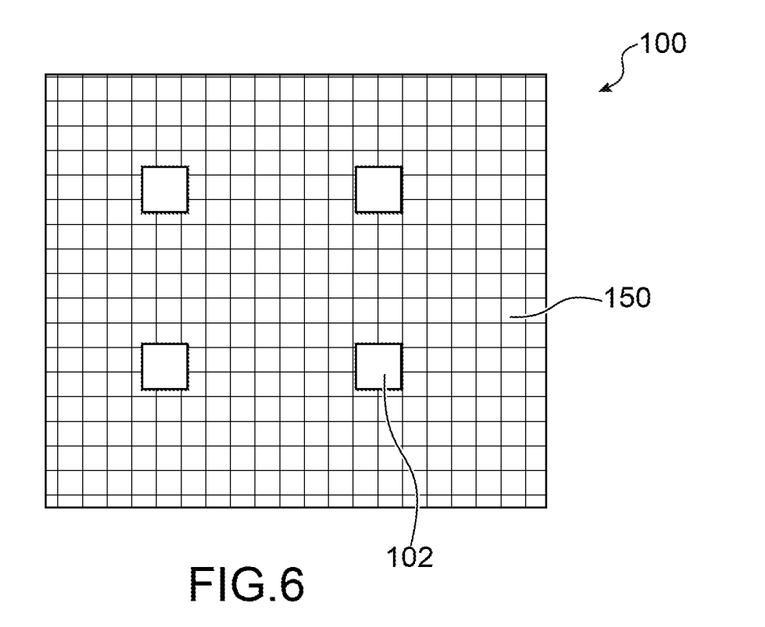
FIG. 6 shows a top view of a part of a sensor comprising a matrix of optical detection pixels interlaced with thermal detection pixels according to a first exemplary embodiment.

FIG. 6 schematically shows such a configuration in which the sensor 100 comprises a matrix of optical detection pixels 150 in which are regularly arranged one or several thermal detection pixels 102.

The dimensions of the pixels 102 are advantageously greater than those of the optical detection pixels of the matrix 150 because important dimensions for the pixels 102 make it possible to carry out more easily a reading in depth of the heat pattern to detect and also to facilitate the formation of a heating pattern suited for the conductive element 112, for example in the form of a coil, a square or any other shape well suited to the heating of the pixels 102. The surface area occupied by each pixel 102 is for example comprised between around 20 mm² and 1 mm².

If the sensor 100 does not comprise emplacements reserved for the pixels 102, the emplacements of certain pixels of the matrix 150 may be reserved for the formation of the pixels 102. Such a sensor 100 is advantageously used to carry out an optical detection of the pattern of the element present on the sensor 100 by the matrix 150, the pixels 102 carrying out a thermal detection making it possible to detect if the element present on the sensor 102 is composed of living matter. Advantageously, several pixels 102 are inserted into the matrix 150 in order to carry out several thermal measurements at different places of the sensor 100, and thereby to avoid the risk that the sensor can be fooled by arranging living matter on one or several emplacements uniquely dedicated to the control of living matter and at the level of which could be arranged the pixels 102.

Another alternative embodiment of the sensor 100 including both the thermal detection pixels 102 and the optical detection pixels may consist in using the pixels 102, produced in the form of a matrix or not, which are optically transparent, for example produced from an ITO/PVDF/ITO stack, and arranged above the optical detection pixels, for example above the matrix 150. This alternative has the advantage of not requiring emplacements for the optical detection matrix which are reserved for the thermal detection pixels 102.

Figure 7:
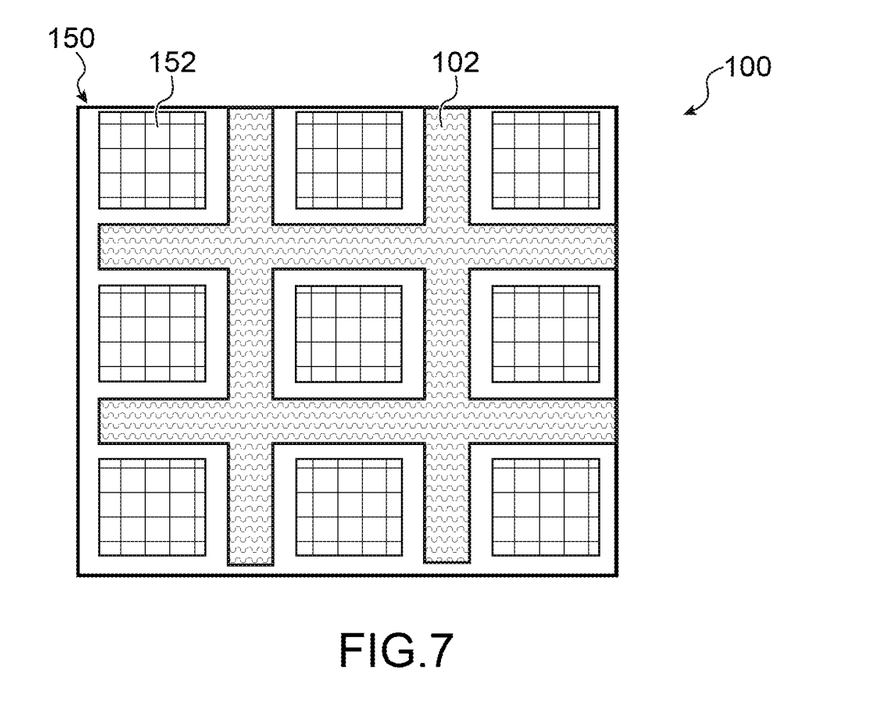
FIG. 7 shows a top view of a part of a sensor comprising a matrix of optical detection pixels interlaced with thermal detection pixels according to a second exemplary embodiment.

Another alternative embodiment of the sensor 100 is shown in FIG. 7, including both thermal detection pixels 102 and optical detection pixels 152 and in which the pixels 102 are formed such that they are interposed between the pixels 152. In the example of FIG. 7, the fact that the pixels 102 are interposed between the pixels 152 is obtained thanks to the formation of each of the pixels 102 in the form of a grid: each column of the grid of a pixel 102 separating two columns of pixels 152 and each line of the grid of a pixel 102 separating two lines of pixels 152. The pixels 102 may be arranged above metal lines and columns of the matrix 150 of pixels 152. The emplacement of at least one pixel 152 may be used to place the control transistor(s) of one of the pixels 102. The contacts and the electronic control elements may also be arranged in the periphery of the matrix 150. This configuration has the advantage of enabling the formation of electronic elements dedicated to the pixels 102 not interfering with those of the matrix 150. Each of the pixels 102 is for example produced in the form of a grid of dimensions equal to around 400×400 μm, with lines and columns of width equal to around 5 μm with a pitch of around 50 μm. With such dimensions, the sensor 100 thus comprises a low number of pixels 102 enabling the use of long reading times. In addition, such a configuration makes the problems of diathermy between neighbouring pixels 102 negligible on account of the important surface of these pixels 102 compared to the thickness of the protective layer(s) covering these pixels 102. For such pixels 102, 152, the emplacements of the pixels 152 may be made only in the layers perturbing the optical detection. Thus, the PVDF may be deposited everywhere (and thus also at the locations of the pixels 152) and only the electrodes of the pixels 102 may be made according to the grid pattern.

The sensor 100 described previously comprises the pyroelectric capacitances forming the heat-sensitive measuring elements of the sensor. Other types of heat-sensitive measuring elements may be used, for example thermistors (of which the value of the electrical resistance varies as a function of the variation in temperature). The thermistors may advantageously be used for the heating by Joule effect of pixels. The reading of the thermistors may in this case be carried out with currents of high value and thus have a measurement of the value of the electrical resistance of these thermistors which is more precise. In this case, it is not necessary to reset the pixels between the first and second measurements of the heat pattern. On the other hand, the initial value of the resistance, at each pixel, is read at the start of acquisition (for example by injecting a current of known value into the thermistors and by measuring the voltage at the terminals of the thermistors), in order to subtract this initial value from the value read at the end of the delay time for the measurement carried out, and thereby to obtain the variation in temperatures. The sequence of the method may in this case be the following:

1—turning on the heating to the power $P_1$;
2—immediately after, reading the value of the pixel which is at the temperature $T_0$;
3—waiting for the first delay time $\zeta_1$, for example equal to around 30 µs;
4—reading the value of the pixel which is at the temperature $T_1$, which makes it possible to obtain the variation in temperature $\Delta T_1 = T_1 - T_0$;
5—modifying of the heating power to $P_2$;
6—waiting for the second delay time $\zeta_2$, for example equal to around 300 µs;
7—reading the value of the pixel which is at the temperature $T_2$, which makes it possible to obtain the variation in temperature $\Delta T_2 = T_2 - T_0$;
8—turning off the heating.

Once again, it is possible to carry out more than two measurements at different delay times and/or dissipated powers.

When the electronic reading elements correspond to the second exemplary embodiment shown in FIG. 5, it is possible to form the pixels 102 such that the active node 126 is arranged near to the surface of the sensor 102 on which the finger is intended to be placed. The presence of skin on the sensor then adds an additional capacitance connected to the active node 126 and which causes an amplification of the signal obtained.

The value of this additional capacitance may be of the same order of magnitude as that of the pyroelectric capacitance, for example equal to around 77 fF, and depends on the thickness and the permittivity of the protective dielectric material present on the sensor and which forms the dielectric of this additional capacitance.

When skin is not present on the pixel, the voltage obtained at the end of the delay time is substantially similar to that which would be obtained with a pixel that would not comprise this additional capacitance. When skin is present on the pixel, the voltage obtained is substantially divided by 2 compared to that which would be obtained without this additional capacitance. The difference obtained between the voltages in the absence and in the presence of skin on the pixel is thus greater. This amplification effect depends on the capacitance produced by the skin and an additional capacitance of high value is advantageously sought in order to facilitate the reading and to increase the signal to noise ratio in the case of a capacitive reading. The first image obtained with the short delay time $\zeta_1$ and/or the low power $P_1$ may be seen as corresponding to the distribution of these additional capacitances formed by the ridges in contact with certain pixels of the sensor 100, due to the fact that this short delay time and/or this low power implies a low exchange of heat between the sensor and the finger. The second image obtained benefits from the greater difference between the voltages described above, thereby amplifying the thermal image obtained. A digital processing may be applied to the two images in order to obtain uniquely the information linked to the thermal characteristics of the skin present on the sensor (said processing may consist for example in dividing the second image by the capacitance estimated from the first image).

The capture method according to one of the embodiments described previously may apply to carrying out a measurement of the hydration of the skin present on the sensor 100.

Indeed, the superficial layer of the skin, the stratum corneum, is constituted of a layer of dead cells. This layer may be more or less hydrated, with a hydration level that can range from 100% to 0%. When its hydration level drops, the skin is going to conduct heat less and less (reduction by a factor 10 of the thermal conductivity between skin with a hydration level equal to 100% and skin with a hydration level equal to 0%), and also store it less and less well (reduction by a factor 2 of the volumetric heat between skin with a hydration level equal to 100% and skin with a hydration level equal to 0%).

The table below gives values of different thermal characteristics of air, water, and skin with different hydration levels:

|  | Thermal conductivity (W/m/K) | Specific heat (J/kg/K) | Density (kg/m$^3$) | Volumetric heat (kJ/m$^3$/K) |
|---|---|---|---|---|
| Air | 0.023 | 1006 | 1.2 | 1.2 |
| Skin 0% | 0.060 | 1550 | 1300 | 2015 |
| Skin 10% | 0.100 | 1770 | 1270 | 2247 |
| Skin 20% | 0.150 | 2002 | 1240 | 2482 |
| Skin 30% | 0.200 | 2244 | 1210 | 2710 |
| Skin 40% | 0.250 | 2499 | 1180 | 2948 |
| Skin 50% | 0.310 | 2767 | 1150 | 3182 |
| Skin 60% | 0.370 | 3050 | 1120 | 3416 |
| Skin 70% | 0.430 | 3348 | 1090 | 3649 |
| Skin 80% | 0.490 | 3663 | 1060 | 3883 |
| Skin 90% | 0.560 | 3997 | 1030 | 4117 |
| Skin 100% | 0.630 | 4350 | 1000 | 4350 |
| Water | 0.604 | 4185 | 1000 | 4185 |

When the capture method described previously is implemented for a fingerprint measurement, the heat pattern measurements are those located down to several tens of microns in depth in the skin. The skin is assumed to be homogeneous over such a distance, and it remains superficial.

Thus, by calibrating the sensor 100, for example by locating the point of maximum hydration (100%) by depositing a little water on the surface of the sensor, air being the other extreme point of this calibration, the measurements of heat pattern carried out can then serve to determine the level of hydration of the skin on account of the differences between the thermal characteristics of the skin at different hydration levels. It is possible to calculate beforehand an abacus, for example by simulation, or to linearize the measurements made, in order that the simple reading of the difference in measurement between the ridges and the valleys makes it possible to give the level of hydration of the skin of which the heat pattern is captured. The level of hydration may also be calculated from an abacus or from a function expressing the level of hydration as a function of the measurement obtained during a measurement of the heat pattern for a pixel on which a ridge has been identified.

A detection of living matter, making it possible to know if the heat pattern captured corresponds to that of a true finger or not, may also be carried out from the calculated hydration level.

When the method for capturing the heat pattern comprises a greater number of phases of heating and measuring the heat pattern, it is possible to calculate several hydration levels from the different measurements carried out, which comes down to calculating the level of hydration for different skin depths.

When the sensor also comprises optical detection elements making it possible to detect an optical image of the finger of which the heat pattern is also detected, the information relative to the hydration level and the optical image may be used together to determine if the finger of which the heat pattern is captured is real or not. Indeed, a finger of which the optical image of the fingerprint comprises very pronounced differences between the ridges and the valleys has to have a high hydration level because, if not, it signifies that said finger is not composed of living matter.

In the embodiments and alternatives described previously, the integration performed by each pixel 102 begins as soon as the heating of the pixel 102 is initiated. Yet, the heat takes a certain time before propagating into the pixel in such a way as to obtain a significant variation in temperature, this variation in temperature corresponding to the data measured during the capture of the heat pattern. In addition, the heat takes a certain time to pass through the protective surface present on the pixels 102 of the sensor 100. The passing through of this protection by the heat does not provide interesting thermal information since it is identical for all the pixels. It is thus interesting not to start the integration during this propagation time of the heat in the protective layer in order to only recover useful thermal information and thereby limit problems of saturation. This may be combined with the possibility of combining thermal detection pixels and capacitive detection pixels described previously.

To do so, it is possible to leave a delay between the start of the heating and the start of the integration of the charges in the pixels. This delay is for example comprised between around 5 ms and 10 ms. If this delay is important, for example greater than around 50% of the complete delay time between the start of heating and the reading in the case of a thick protective surface slowing down the transfer of heat, it may be advantageous to start the heating during the reading of the preceding line of pixels, by arranging not to cause undesirable switching.

This delay further has the advantage of pushing back the instant where the heating starts up from that where the measurement begins, which if not causes current draws and thus noise through the power supplies.

In an alternative, this delay may be used to estimate the disparities between pixels resulting from the process of production of the sensor (PRNU for Photo Response Non Uniformity), and next to correct these disparities. For example, the protective surface may be slightly thinner or thicker at certain spots, or damaged (presence of scratches) following intensive use during the lifetime of the sensor. Advantageously, a time filtering is added to limit the amplification of noise. A preliminary measurement of the heat pattern may thus be carried out using this delay. In the image obtained by this preliminary measurement, the pixels have all heated in an identical manner. Thus, the differences measured between the pixels correspond to the "fixed noise" or FPN (Fixed-Pattern Noise), linked to the defects of the sensor. Assuming that the FPN is corrected furthermore or low compared to the PNRU, this image may thus make it possible to know the PNRU and to compensate it on the following images.

It is also possible to determine this fixed noise by capturing beforehand an image without an element (finger) present on the sensor.

It is also possible to conserve in a memory an image of this PNRU, supplied by multiple acquisitions to average out its value and to eliminate random noise. For example, it is possible to use an infinite pulse response filter: if Im is the average image and I the newly acquired image, the updating of the average image may be carried out such that Im=(1−A)·Im+A·I, A being a parameter making it possible to regulate the response speed of the filter. Here, the value of the parameter A is chosen small, that is to say less than around 0, 1 and for example of the order of 0.01.

The fact of not conserving the thermal information of the first instants of the heating in the image eliminates part of the thermal information linked to the protective surface, but that does not mean to say that there is no longer influence of this protection on the continuation of the reading. It is thus advantageously possible to combine, with appropriate coefficients, this image of the first instants of heating with the image obtained while not taking account of these first instants, in order to access interesting information, that is to say information concerning uniquely the element(s) present on the sensor.

In all the embodiments described previously, the heating power is advantageously similar during the different heating phases, only the delay times varying to carry out the different measurements of the heat pattern at different depths of the element of which the heat pattern is measured. Moreover, the reading of the pixels 102 may advantageously be carried out line of pixels by line of pixels, but may also be pixel by pixel, or instead read in one go in the case of a scanning sensor.

What is claimed is:

1. A method for capturing a heat pattern with a sensor comprising several pixels each including at least one heat-sensitive measuring element, the sensor further including at least one heating element capable of heating the heat-sensitive measuring element of each of said pixels during a measurement of the heat pattern by the heat-sensitive measuring element of said pixel, the method including for each of said pixels:
   a first step of heating the heat-sensitive measuring element of the pixel, in which a first amount of heating power is dissipated in the heat-sensitive measuring element of the pixel;
   a first step of measuring the heat pattern present on the pixel, including a first read-out of at least one temperature variable parameter of the heat-sensitive measuring element of the pixel after a first delay time;
   a second step of heating the heat-sensitive measuring element of the pixel, in which a second amount of heating power is dissipated in the heat-sensitive measuring element of the pixel;
   a second step of measuring the heat pattern present on the pixel, including a second read-out of the temperature variable parameter of the heat-sensitive measuring element of the pixel after a second delay time;
   in which the value of the first power is different from that of the second power and/or the value of the first delay time is different from that of the second delay time such that first and second images of the heat pattern, corresponding respectively to all of the first measurements of the heat pattern and to all of the second measurements of the heat pattern, correspond to thermal measurements carried out at different depths in the element(s) present on the sensor during the measurements, and
   further comprising, after the second step of measuring the heat pattern present on each of the pixels, a step of digital processing of the first and second images of the heat pattern, corresponding respectively to all of the first measurements of the heat pattern and to all of the second measurements of the heat pattern, including at least one comparison and/or at least one linear combination of the first and second images.

2. The method according to claim 1, in which the value of the first delay time is less than that of the second delay time, and/or in which the value of the first power is less than that of the second power.

3. The method according to claim 1, in which a ratio between the first and second delay times is comprised between around 2 and 10, and/or a ratio between the first and second heating powers is greater than or equal to 10.

4. The method according to claim 1, in which the first and second steps of heating the heat-sensitive measuring element of the pixel are implemented in the form c a continuous heating phase at constant power.

5. The method according to claim 1, further comprising, between the second step of measuring the heat pattern present on each of the pixels and the step of digital processing the first and second images of the heat pattern, a step of deconvolution of the second image.

6. The method according to claim 1, further comprising, after the step of digital processing of the first and second images of the heat pattern, a step of identification of ridges and valleys of a fingerprint from the data coming from the step of digital processing of the first and second images of the heat pattern.

7. The method according to claim 6, further comprising, after the step of identification of the ridges and valleys of the fingerprint:
a step of calculation of a hydration level of the skin of which the heat pattern has been measured, from an abacus or a function expressing the level of hydration as a function of the result obtained during a measurement of the heat pattern for a pixel on which a ridge has been identified, or
a step of calculation of a difference in measurements between that obtained during the second measurement of the heat pattern for a first pixel on which a ridge has been identified and that obtained during the second measurement of the heat pattern for a second pixel on which a valley has been identified, then a step of calculation of a hydration level of the skin of which the heat pattern has been measured, from an abacus or from a function expressing the level of hydration as a function of the difference in measurements between a ridge and a valley of a fingerprint.

8. The method according to claim 7, further comprising, after the step of calculation of the hydration level of the skin, a step of classification of regions of the measured heat pattern according to the calculated value of the hydration level for the pixels of said regions.

9. The method according to claim 7, comprising the calculation of several hydration levels from the different measurements made.

10. The method according to claim 1, in which:
each heat-sensitive measuring element comprises at least one pyroelectric capacitance formed by at least one portion of pyroelectric material arranged between the first and second electrodes;
the heating element is capable of heating by Joule effect the portion of pyroelectric material of the pyroelectric capacitance of said pixel;
the first step of heating the heat-sensitive measuring element of a pixel includes an application of a first heating voltage to the terminals of the heating element, dissipating the first heating power by Joule effect in the portion of pyroelectric material of the pyroelectric capacitance of the pixel;
the first measurement of the heat pattern present on a pixel includes a read-out of the charges generated by the pixel during the first delay time;
the second heating of the heat-sensitive measuring element of a pixel includes an application of a second heating voltage to the terminals of the heating element, dissipating the second heating power by Joule effect in the portion of pyroelectric material of the pyroelectric capacitance of the pixel;
the second measurement of the heat pattern present on the pixel includes a read-out of the charges generated by the pixel during the second delay time.

11. The method according to claim 1, in which:
each heat-sensitive measuring element comprises at least one pyroelectric capacitance formed by at least one portion of pyroelectric material arranged between first and second electrodes, and
the heating element is capable of emitting a light radiation intended to heat the portions of pyroelectric material of the pyroelectric capacitances of the pixels.

12. The method according to claim 11, in which the light radiation emitted by the heating element is oriented on a protective layer of the pixels and/or one of the first and second electrodes of the pixels.

13. The method according to claim 1, in which the sensor further comprises optical or capacitive detection elements interlaced with the pixels including the heat-sensitive measuring elements.

14. The method according to claim 1, in which a non-zero delay separates the start of the first heating and the start of the first delay time, and further comprising the implementation of a preliminary measurement of the heat pattern present on the pixels via a read-out of the temperature variable parameter of the heat-sensitive measuring elements of the pixels at the end of said delay, then an estimation of the disparities between the pixels of the sensor from the preliminary measurement of the heat pattern.

* * * * *